US009504082B2

(12) United States Patent
Johansson et al.

(10) Patent No.: US 9,504,082 B2
(45) Date of Patent: Nov. 22, 2016

(54) METHOD OF ENHANCED CONNECTION RECOVERY AND LOSS-LESS DATA RECOVERY

(71) Applicant: MEDIATEK INC., Hsinchu (TW)

(72) Inventors: Per Johan Mikael Johansson, Kungsangen (SE); Yih-Shen Chen, Hsinchu (TW); Tze-Ping Low, Lexington, MA (US); William Plumb, Charlestown, MA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/709,479

(22) Filed: May 12, 2015

(65) Prior Publication Data

US 2015/0245405 A1    Aug. 27, 2015

Related U.S. Application Data

(63) Continuation of application No. 13/743,644, filed on Jan. 17, 2013.

(60) Provisional application No. 61/587,979, filed on Jan. 18, 2012.

(51) Int. Cl.
*H04W 76/02* (2009.01)
*H04W 36/08* (2009.01)
*H04W 36/24* (2009.01)
(Continued)

(52) U.S. Cl.
CPC ....... *H04W 76/028* (2013.01); *H04W 36/0061* (2013.01); *H04W 36/0072* (2013.01); *H04W 36/08* (2013.01); *H04W 36/24* (2013.01); *H04W 40/36* (2013.01); *H04W 48/17* (2013.01);
(Continued)

(58) Field of Classification Search
None
See application file for complete search history.

(56) References Cited

U.S. PATENT DOCUMENTS

| 2010/0130205 A1 | 5/2010 | Jung et al. ................ 455/435.2 |
| 2010/0166184 A1* | 7/2010 | Wu ....................... H04W 12/04 380/270 |

(Continued)

FOREIGN PATENT DOCUMENTS

| AU | 2009263325 A1 | 12/2009 |
| CN | 101651899 A | 2/2010 |

(Continued)

OTHER PUBLICATIONS

International Search Report and Written Opinion of International Search Authority for PCT/CN2013/070674 dated Apr. 25, 2013(11 pages).

(Continued)

*Primary Examiner* — Vincelas Louis
(74) *Attorney, Agent, or Firm* — Imperium Patent Works; Zheng Jin

(57) ABSTRACT

An enhanced connection recovery upon lost RRC connection due to radio link failure (RLF) or handover failure (HOF) is proposed. A UE first establishes an RRC connection in a source cell in a mobile communication network. Later on, the UE detects a failure event and starts an RRC reestablishment procedure in a target cell to restore the RRC connection. In a first novel aspect, a fast NAS recovery process is applied to reduce the outage time in the target cell. In a second novel aspect, context fetching is used to reduce the outage time in the target cell. In a third novel aspect, a loss-less reestablishment procedure is proposed to reduce data loss during the connection recovery.

12 Claims, 11 Drawing Sheets

(51) Int. Cl.
*H04W 48/00* (2009.01)
*H04W 40/36* (2009.01)
*H04W 36/00* (2009.01)

(52) U.S. Cl.
CPC ....... *H04W76/027* (2013.01); *H04W 36/0033* (2013.01); *H04W 36/0055* (2013.01)

(56) References Cited

U.S. PATENT DOCUMENTS

| | | | |
|---|---|---|---|
| 2010/0197313 A1 | 8/2010 | Suronen et al. | 455/450 |
| 2010/0279695 A1 | 11/2010 | Amirijoo et al. | 455/438 |
| 2010/0318670 A1 | 12/2010 | Al-Shalash et al. | 709/229 |
| 2010/0330982 A1 | 12/2010 | Ishii et al. | 455/422.1 |
| 2011/0053586 A1 | 3/2011 | Snow et al. | 455/423 |
| 2011/0080825 A1 | 4/2011 | Dimou et al. | 370/216 |
| 2011/0117905 A1 | 5/2011 | Huang et al. | 455/422.1 |
| 2011/0117954 A1 | 5/2011 | Iwamura et al. | 455/525 |
| 2011/0124358 A1 | 5/2011 | Iwamura et al. | 455/507 |
| 2011/0159802 A1 | 6/2011 | Binti Harum et al. | 455/7 |
| 2011/0167312 A1 | 7/2011 | Ogawa et al. | 714/749 |
| 2011/0230185 A1 | 9/2011 | Tanaka et al. | 455/425 |
| 2011/0242965 A1 | 10/2011 | Strzyz et al. | 370/216 |
| 2011/0250892 A1 | 10/2011 | Gupta et al. | 455/437 |
| 2011/0268085 A1* | 11/2011 | Barany | H04W 36/0033 370/331 |
| 2011/0269426 A1 | 11/2011 | Hultin et al. | 455/411 |
| 2011/0287773 A1 | 11/2011 | Huang et al. | 455/450 |
| 2011/0292790 A1 | 12/2011 | Iwamura et al. | 370/225 |
| 2011/0317552 A1 | 12/2011 | Lee et al. | 370/228 |
| 2012/0165013 A1 | 6/2012 | Nishida et al. | 455/435.1 |
| 2013/0039339 A1* | 2/2013 | Rayavarapu | H04W 76/028 370/331 |
| 2014/0036685 A1 | 2/2014 | Kim et al. | 370/236 |
| 2014/0051428 A1 | 2/2014 | Jung et al. | 455/422.1 |

FOREIGN PATENT DOCUMENTS

| | | |
|---|---|---|
| CN | 101827428 A | 9/2010 |
| CN | 101883381 A | 11/2010 |
| CN | 101940031 A | 1/2011 |
| CN | 102036284 A | 4/2011 |
| CN | 102111787 A | 6/2011 |
| CN | 102165821 A | 8/2011 |
| CN | 102308657 A | 1/2012 |
| JP | 2009049486 | 3/2009 |
| JP | 2009213057 | 9/2009 |
| JP | 2010141613 | 6/2010 |
| JP | 2010226746 | 10/2010 |
| JP | 2011009798 | 1/2011 |
| JP | 2011066466 | 3/2011 |
| WO | WO2009075341 A1 | 6/2009 |
| WO | WO2009084998 A1 | 7/2009 |
| WO | WO2009126078 A1 | 10/2009 |
| WO | WO2010035495 | 4/2010 |
| WO | WO2010048583 | 4/2010 |
| WO | WO2010142079 A1 | 12/2010 |
| WO | WO2010145697 A1 | 12/2010 |
| WO | WO2011123805 | 10/2011 |
| WO | WO2011127444 | 10/2011 |

OTHER PUBLICATIONS

International Search Report and Written Opinion of International Search Authority for PCT/CN2013/070698 dated Apr. 25, 2013(11 pages).
3GPP TSG-RAN WG3 Meeting #69 R3-102106, CMCC, CATT, "Further Enhancement for MRO Mechanism", Madrid, Spain Aug. 13-17, 2010 (4 pages).
USPTO, Office Action for related U.S. Appl. No. 13/743,612 dated Jun. 27, 2014 (11 pages).
JPO, Office Action for the JP patent application 2014-545092 dated May 12, 2015 (8 pages).
JPO, Office Action for the JP patent application 2014-545091 dated Jun. 2, 2015 (6 pages).
R3-103243 3GPP TSG-RAN WG3 #70; CATT; Handling of RLF Indication Duplication; Jacksonville, US dated Nov. 15-19, 2010 (4 pages).
R3-100239 3GPP TSG RAN WG3 Meeting #66-bis; Nokia Siemens Networks; Enabling UE-Originated RLF Reporting for SON MRO; Valencia, Spain dated Jan. 18-22, 2010 (4 pages).
R2-071717 3GPP TSG-RAN WG2 Meeting #58; Nokia, NSN; Handover Failure Recovery; Kobe, Japan dated May 7-11, 2007 (4 pages).
3GPP TS 36.300 V10.6.0; 3rd Generation Partnership Project; Technical Specification Group Radio Access Network; Evolved Universal Terrestrial Radio Access (E-UTRA) and Evolved Universal Terrestrial Radio access Network (E- UTRAN); Overall Description; Stage 2 (Release 10).
EPO, Search Report for the EP patent application 13738699.1 dated Feb. 19, 2016 (6 pages).
EPO, Search Report for the EP patent application 13739119.9 dated Feb. 19, 2016 (6 pages).
SIPO, Search Report (no English translation is available) for the CN patent application 201380000575.7 dated Mar. 1, 2016 (10 pages).
3GPP TSG-RAN WG3#64 R3-091027, Qualcomm Europe et al., Network based solutions to inbound mobility in the presence of PCI confusion, San Francisco, USA dated May 4-8, 2008 (4 pages).
3GPP TS 36.331 V10.4.0 (Dec. 2011), 3rd Generation Partnership Project; Technical Specification Group Radio Access Network; Evolved Universal Terrestrial Radio Access (E-UTRA); Radio Resource Control (RRC); Protocol specification (Release 10) *p. 53-130*.
3GPP TS 23.060 V11.0.0 (Dec. 2011), 3rd Generation Partnership Project; Technical Specification Group Services and System Aspects; General Packet Radio Service (GPRS); Service description; Stage 2 (Release 11) *p. 280-281*.
3GPP TSG-RAN WG3 Meeting #65 R3-091567, CATT, UE Context Acquirement for Connection Re-establishment, Shenzhen, China dated Aug. 24-28, 2009 (5 pages).
SIPO, Search Report for the CN patent application 201380000507.0 (no English translation is available) dated Sep. 11, 2015 (7 pages).
SIPO, Search Report for the CN patent application 201380000575.7 (no English translation is available) dated Sep. 29, 2015 (13 pages).
3GPP TSG-RAN WG3 Meeting #65 R3-091567, CATT, UE Context Acquirement for Connection Re-Establishment, Shenzheng, China dated Aug. 24-28, 2009 (5 pages).
3GPP TS 36.300 V10.6.0; 3rd Generation Partnership Project; Technical Specification Group Radio Access Network; Evolved Universal Terrestrial Radio Access (E-UTRA) and Evolved Universal Terrestrial Radio access Network (E- UTRAN); Overall Description; Stage 2 (Release 11), p. 60-66.
USPTO, Office Action for related U.S. Appl. No. 14/706,967 dated Sep. 7, 2016 (8 pages).

* cited by examiner

FAST RLF AND ENHANCED CELL SELECTION

FAST RADIO LINK FAILURE

FAST RLF WITH NEW TIMER

CELL SELECTION WITH PRIORITIZATION

ENHANCED IRAT MULTI-REGISTRATION

FAST RADIO LINK FAILURE

CELL SELECTION WITH PRIORITIZATION

FAST NAS RECOVERY 1

FAST NAS RECOVERY 2

CONTEXT FETCH

LOSS-LESS DATA RECOVERY

FAST NAS RECOVERY

FAST NAS RECOVERY

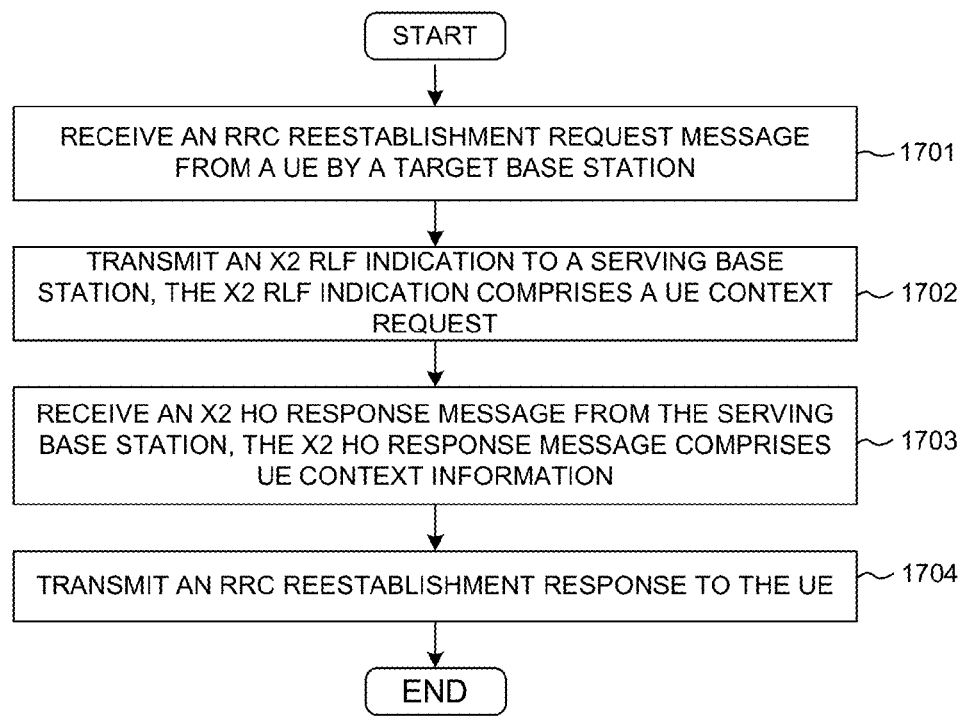
FIG. 17 — CONTEXT FETCH
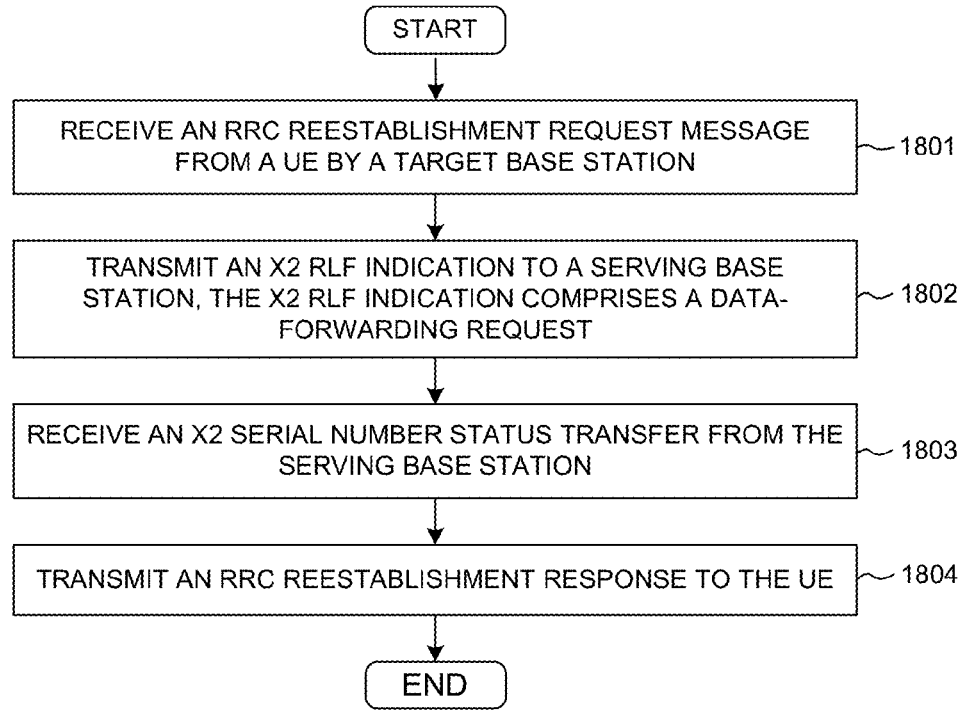
FIG. 18 — LOSS-LESS RECOVERY

METHOD OF ENHANCED CONNECTION RECOVERY AND LOSS-LESS DATA RECOVERY

CROSS REFERENCE TO RELATED APPLICATIONS

This application is a continuation, and claims priority under 35 U.S.C. §120 from nonprovisional U.S. patent application Ser. No. 13/743,644, entitled "Method of Enhanced Connection Recovery and Loss-less Data Recovery," filed on Jan. 17, 2013, the subject matter of which is incorporated herein by reference. Application Ser. No. 13/743,644, in turn, claims priority under 35 U.S.C. §119 from U.S. Provisional Application No. 61/587,979, entitled "Method of Fast Re-Establishment," filed on Jan. 18, 2012, the subject matter of which is incorporated herein by reference.

TECHNICAL FIELD

The disclosed embodiments relate generally to enhanced connection recovery in mobile communication network, and, more particularly, to enhanced connection recovery upon lost RRC connection due to radio link failure (RLF) or handover failure (HOF).

BACKGROUND

In 3GPP Long-Term Evolution (LTE) networks, an evolved universal terrestrial radio access network (E-UTRAN) includes a plurality of base stations, e.g., evolved Node-Bs (eNBs) communicating with a plurality of mobile stations referred as user equipments (UEs) over established radio resource control (RRC) connections. Radio link monitoring (RLM) is a mechanism for a UE to monitor the quality of a downlink (DL) channel of its serving cell for determining if the radio link is good enough to continue transmission. For example, the UE measures cell-specific reference signal (CRS) to detect the downlink radio link quality for the serving cell. The UE also compares the estimated DL quality to thresholds (e.g., $Q_{OUT}$ and $Q_{IN}$) for determining if the link between the serving cell and the UE is good enough or not. In addition to RLM, the UE declares radio link failure (RLF) upon the occurrences of physical layer problems based on N310/N311/T310 mechanism, random access problem indication from MAC layer, and indication from RLC layer that the maximum number of retransmission has been reached. Once RLF is detected, the UE gathers and stores RLF information and attempts to restore the RRC connection by performing an RRC reestablishment procedure.

For mobility management in LTE systems, each UE needs to periodically measure the received reference signal power and the qualities of the serving cell and neighbor cells and reports measurement results to its serving eNB for potential handover or cell reselection. Measurements, such as Reference signal received power (RSRP) and/or Reference signal received quality (RSRQ) of an LTE cell, are used to to rank among the different cells for the purpose of mobility management. Properly managed handover can prevent loss of connection. In practice, however, handover failure (HOF) often occurs due to various reasons such as UE signaling problems and UE measurement configuration problems. Typically, a radio link failure or handover failure indicates too early handover, too late handover, or handover to a wrong cell. After the RLF/HOF event, the UE will attempt an RRC reestablishment procedure to restore the RRC connection.

When performing RRC reestablishment, the UE releases current RRC configuration and performs cell selection. The prerequisite of a successful RRC reestablishment procedure is that the selected cell for RRC reestablishment has UE context. If the UE fails to restore the RRC connection, then the UE enters RRC idle mode and tries to camp on a cell via a non-access Stratum (NAS) recovery procedure. The UE may indicate the availability of the RLF report to eNB and report the RLF/HOF information to eNB upon request after successful RRC connection reestablishment or RRC connection setup. Based on the RLF report, possible corrective action may be applied by the network to prevent future connection failures.

An LTE-Advanced (LTE-A) system improves spectrum efficiency by utilizing a diverse set of base stations deployed in a heterogeneous network (HetNet) fashion. Using a mixture of macro, pico, femto and relay base stations, heterogeneous networks enable flexible and low-cost deployments and provide a uniform broadband user experience. In a heterogeneous network, smarter resource coordination among base stations, better base station selection strategies and more advance techniques for efficient interference management can provide substantial gains in throughput and user experience as compared to a conventional homogeneous network.

In HetNet scenario (e.g., macro-pico deployment), however, it is expected that HOF/RLF rate would increase. For example, HOF/RLF may occur due to imprecise pico cell measurement or not enough time for pico-macro handover. It is thus desirable to improve the connection recovery procedure to reduce outrage time and to reduce data loss during the connection recovery.

SUMMARY

An enhanced connection recovery upon lost RRC connection due to radio link failure (RLF) or handover failure (HOF) is proposed. A UE first establishes an RRC connection in a source cell in a mobile communication network. Later on, the UE detects a failure event and starts an RRC reestablishment procedure in a target cell to restore the RRC connection. The enhance connection recovery may be performed from UE/radio access perspective or from network perspective. From UE/radio access perspective, the enhanced connection recovery may be applied to reduce the outage time in the source cell (e.g., via fast RLF) or to reduce the outage time in the target cell (e.g., via enhance cell selection and multi-RAT registration). From network perspective, the enhanced connection recovery may be applied to reduce the outage time in the target cell (e.g., via fast NAS recovery and context fetch), or to reduce data loss during the recovery (e.g., via loss-less data recovery).

In a first novel aspect, a fast RLF process is applied to reduce the outage time in the serving cell. In one embodiment, in addition to legacy T310 timer, a new timer (e.g., T310a) is started when the UE sends a measurement report to the eNB. RRC reestablishment is performed when the new timer expires. In another embodiment, the UE initiates RRC reestablishment before T310 timer expires if a candidate cell (e.g., a neighbor cell with better radio link quality than the serving cell) is identified by the UE itself.

In a second novel aspect, an enhanced cell selection mechanism based on cell prioritization information is applied to reduce the outage time in the target cell. The priority for cell selection is based on frequency layers with good mobility coverage or based on intra-frequency cells with good mobility coverage. The cell prioritization information may be carried by broadcasting or unicasting and PCI ranging mechanism may be used to identify the mobility cells. In one embodiment, multi-RAT registration is applied to steer cell selection. In another embodiment, the cell prioritization is selectively applied to UEs with high mobility state.

In a third novel aspect, a fast NAS recovery process is applied to reduce the outage time in the target cell. In one embodiment, a NAS service request is triggered by the RRC reestablishment request. The target base station inquires UE context from an MME via S1 interface upon receiving the NAS service request. Because the NAS service request is triggered earlier, the target eNB can obtain the UE context information quicker and thus reduce the outage time in the target cell.

In a fourth novel aspect, context fetching is used to reduce the outage time in the target cell. In one embodiment, the target eNB sends an RLF indication to the source eNB via X2 interface, and the RLF indication comprises a UE context request. In response to the RLF indication, the source eNB sends the UE context information to the target eNB. As a result, RRC reestablishment is successfully completed and the outage time in the target cell is reduced.

In a fifth novel aspect, a loss-less reestablishment procedure is proposed to reduce data loss during the connection recovery. In one embodiment, the target eNB sends an RLF indication to the source eNB, and the RLF indication comprises data-forwarding request. In response to the RLF indication, the source eNB sends PDCP SN status and U-plane data to the target eNB. The PDCP operation is thus resumed without data loss.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 17 is a flow chart of a method of RRC reestablishment procedure with context fetching.

FIG. 18 is a flow chart of a method of loss-less RRC reestablishment procedure.

DETAILED DESCRIPTION

Reference will now be made in detail to some embodiments of the invention, examples of which are illustrated in the accompanying drawings.

Figure 1:
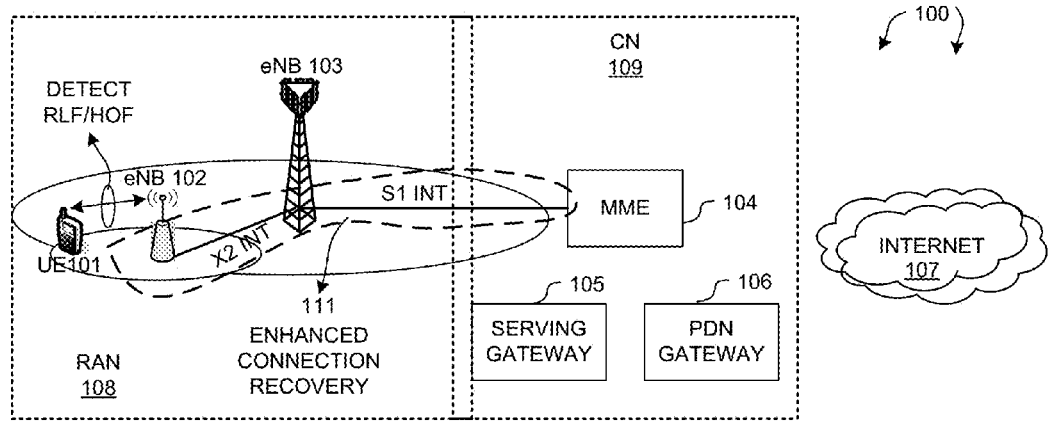
FIG. 1 illustrates a mobile communication network with enhanced connection recovery in accordance with one novel aspect.

FIG. 1 illustrates a mobile communication network 100 with enhanced connection recovery in accordance with one novel aspect. Mobile communication network 100 comprises a user equipment UE 101, a radio access network (RAN) 108 having a first base station eNB 102, a second base station eNB 103, a packet core network (CN) 109 having a mobility management entity MME 104, a serving gateway SGW 105, and a packet data network (PDN) gateway PGW 106, and Internet 107. The base stations communicate with each other via the X2 interface, and each base station communicates with MME 104 via the S1 interface. UE 101 may access Internet 107 via the radio access network RAN 108 and the packet core network CN 109.

UE 101 first establishes a radio resource control (RRC) connection with its serving base station eNB 102 as a source cell. Later on, UE 101 detects a failure event such as a radio link failure (RLF) or a handover failure (HOF). UE 101 then performs an RRC reestablishment procedure to restore the RRC connection. For example, UE 101 may select a target cell with the target base station eNB 103 and performs the RRC reestablishment. If the RRC reestablishment fails, then UE 101 may go to RRC idle mode and starts non-access stratum (NAS) recovery to establish a new RRC connection. During the connection recovery process, the RRC connection is interrupted. The interruption time is referred to as connection outage time. In addition, certain amount of data may be lost during the recovery. In one novel aspect, an enhanced connection recovery process 111 (e.g., that involves UE, RAN, X2 interface and S1 interface) is applied to reduce the outage time in the source/target cell and to reduce the data loss during the connection recovery.

Figure 2:
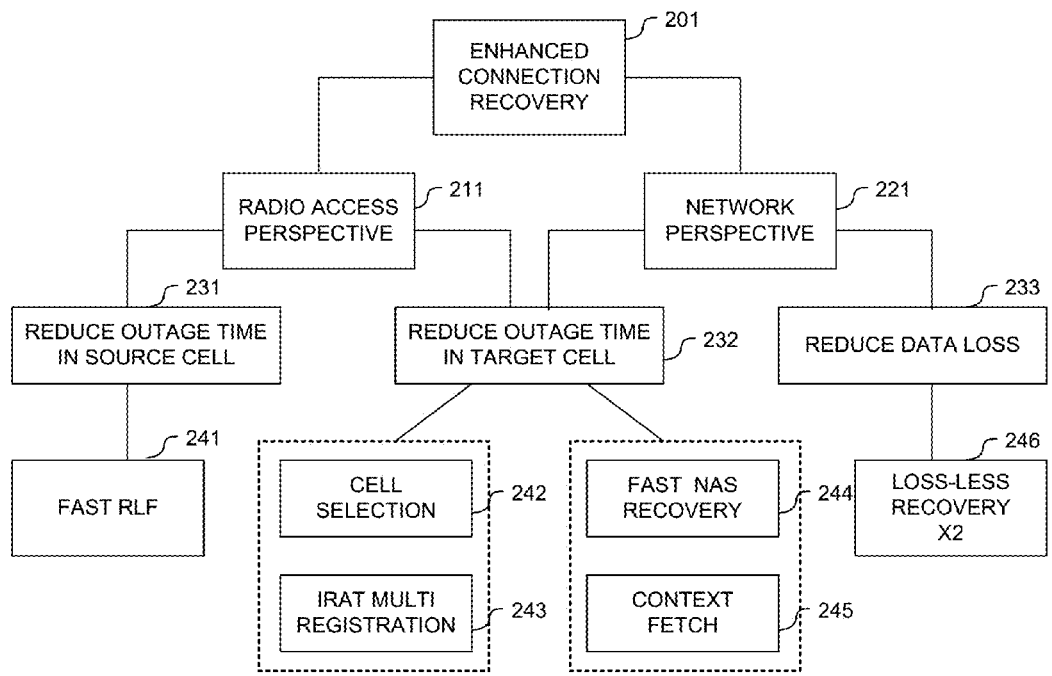
FIG. 2 is a diagram that illustrates different embodiments of enhanced connection recovery in accordance with one novel aspect.

FIG. 2 is a diagram that illustrates different embodiments of enhanced connection recovery in accordance with one novel aspect. As illustrated in FIG. 2, an enhanced connection recovery process 201 may be performed from UE/radio access perspective (as depicted by box 211) or from network perspective (as depicted by box 221). From UE/radio access perspective, the enhanced connection recovery may be applied to reduce the outage time in the source cell (as depicted by box 231), or to reduce the outage time in the target cell (as depicted by box 232). To reduce outage time in the source cell, a fast RLF procedure 241 may be used. On the other hand, to reduce outage time in the target cell, enhanced cell selection 242 may be used. For inter radio access technology (IRAT) scenario, IRAT multi registration 243 may be applied to reduce outage time in the target cell.

From network perspective, the enhanced connection recovery may be applied to reduce the outage time in the target cell (as depicted by box 232), or to reduce data loss (as depicted by box 233). In order to reduce outage time in the target cell, a novel fast NAS recovery 244 may be used. Alternatively, a novel context fetching 245 may be used. On the other hand, in order to reduce data loss, a loss-less recovery mechanism 246 may be applied via the X2 interface. The different embodiments of the enhanced connection recovery proves are illustrated below with additional details.

Figure 3:
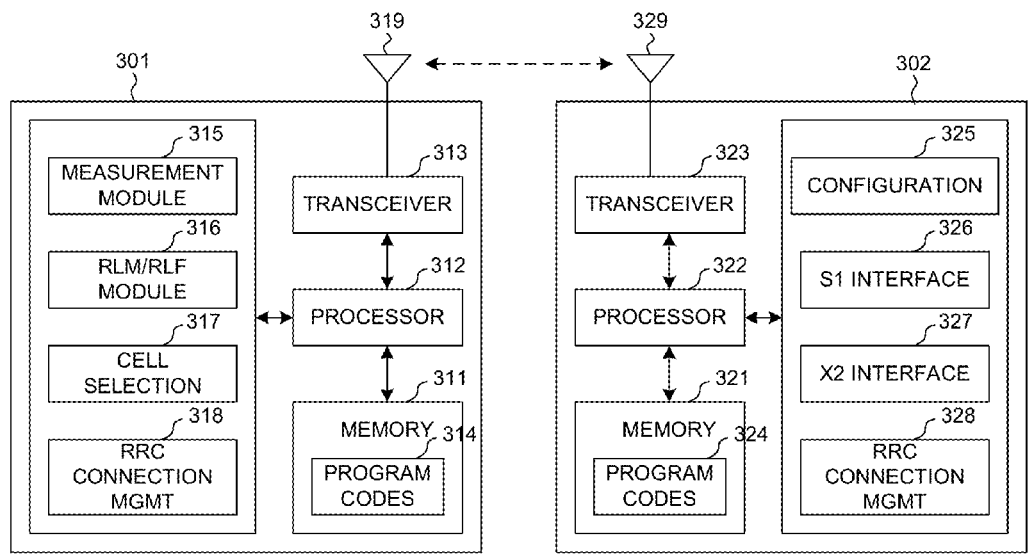
FIG. 3 is a simplified block diagram of a UE and an eNodeB in accordance with one novel aspect.

FIG. 3 is a simplified block diagram of a user equipment UE 301 and a base station eNodeB 302 in accordance with one novel aspect. User equipment UE 301 comprises memory 311 having program codes 314, a processor 312, a transceiver 313 coupled to an antenna module 319. User equipment UE 301 also comprises various function modules including a measurement module 315 that performs various measurements based on measurement configurations, an RLM/RLF module 316 that performs radio link monitoring, radio link failure detection and handling, a cell selection module 317 that performs cell selection for connection establishment and recovery, and an RRC connection management module 318 that performs RRC connection setup procedures and maintains RRC connection. Similarly, base station eNodeB 302 comprises memory 321 having program codes 324, a processor 322, a transceiver 323 coupled to an antenna module 329. Base station eNodeB 302 also comprises various function modules including a configuration module 325 that provides various configuration to UE 301, an S1 interface module 326 that manages communication with an MME in the core network, an X2 interface module 327 that manages communication with other base stations, and an RRC connection management module 328 that performs RRC connection setup procedures and maintains RRC connection.

The different modules are function modules that can be implemented by software, firmware, hardware, or any combination thereof. The function modules, when executed by the processors (e.g., via executing program codes 314 and 324), allow UE 301 and eNB 302 to perform enhanced connection recovery upon detecting a connection failure event. In a first example, RLM/RLF module 316 detects a radio link problem and invokes a fast RLF mechanism to reduce the outage time in the source cell. In a second example, cell selection module 317 performs enhanced cell selection upon a failure event to reduce the outage time in the target cell. In a third example, context fetching or fast NAS recovery is performed by eNB 302 via the X2/S1 interface module 326/327 to reduce the outage time in the target cell. Finally, in a fourth example, loss-less RRC reestablishment is performed by eNB 302 via the X2 interface module 327 to reduce data loss during the connection recovery.

Fast RLF and Enhanced Cell Selection

Figure 4:
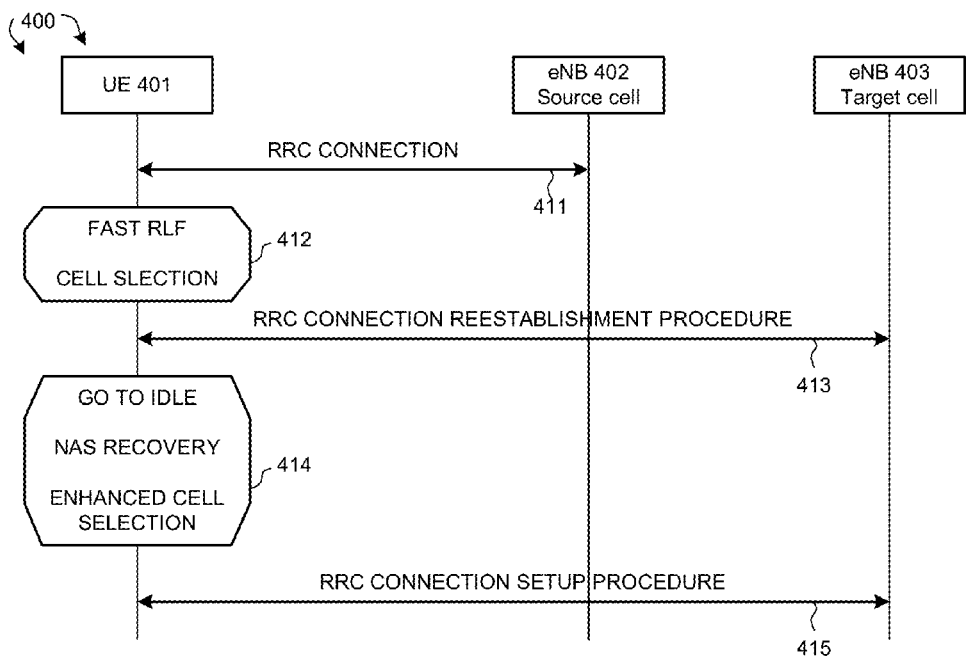
FIG. 4 illustrates enhanced connection recovery from radio access network perspective.

FIG. 4 illustrates enhanced connection recovery from UE/radio access network perspective in a mobile communication network 400. Mobile communication network 400 comprises a UE 401, a serving eNB 402 (for connection in a source cell), and a target eNB 403 (for connection in a target cell). From UE/radio access perspective, connection recovery may be enhanced by a fast RLF procedure to reduce outage time in the source cell and by an enhanced cell selection mechanism to reduce outage time in the target cell.

In step 411, UE 401 establishes an RRC connection with eNB 402 in the source cell. Later on, UE 401 detects a possible radio link problem, e.g., link quality is lower than a threshold $Q_{OUT}$. For legacy RLF procedure, a T310 timer is then started and RLF is detected when T310 timer expires. UE 401 then selects a cell and tries to restore the RRC connection. This is an eNB-controlled mechanism and the timer value is configured by the network. However, the legacy RLF procedure with T310 timer may not provide enough flexibility for better performance, especially with respect to small cells. For example, a small cell may not provide good coverage of the coverage layer and long RLF detection time may not be suitable. Under those cases, the legacy RLF solution would lead to frequent RRC reestablishments.

In one novel aspect, UE 401 initiates a fast RLF procedure in step 412, during which the evaluation of RLF is not only dependent on the source cell timer and filter, but also dependent on the signal strength and/or quality of the selected reestablishment cell. For example, if there is an identified reestablishment cell (e.g., implicitly or explicitly), and the reestablishment cell is radio-wise "good enough", then RLF evaluation is shortened and the UE goes to the reestablishment cell. In step 413, UE 401 performs RRC reestablishment with eNB 403 in the target cell. The RRC reestablishment may fail if the target eNB 403 does not have UE context information. In step 414, UE 401 goes to RRC idle mode and initiates NAS recovery when RRC reestablishment fails. After cell selection, in step 415, UE 401 performs RRC connection setup with eNB 403 in the selected target cell.

The cell selection in step 414 is performed when RRC reestablishment failure occurs. In current LTE systems, UE follows legacy cell selection method to select a suitable cell. However, in HetNet deployment (e.g., macro-pico), there might be frequent RRC reestablishment if there is no differentiation among cells and frequency layers with respect to cell selection. For example, a high-mobility UE may move out of the coverage of a pico cell easily. In such case, if UE can reestablish an RRC connection with a macro cell, then it is expected to have less frequent RRC connection reestablishment.

In one novel aspect, UE 401 applies an enhanced cell selection method in step 414. In one embodiment, after RRC reestablishment fails, UE 401 selects the target cell with priority. The priority may be assigned based on frequency layers or based on intra-frequency cells. In multi-frequency HetNet deployment, one frequency layer is configured as a mobility layer. UE selects a cell in the mobility layer with priority when reestablishment fails. In single-frequency HetNet deployment, cells with larger coverage such as macro cells are configured as mobility cells. UE selects one of the macro cells with priority when reestablishment fails. In another embodiment of enhanced cell selection, UE with high moving speed should re-connect to the coverage layer, which is indicated by eNB via broadcasting or unicasting. For example, if UE mobility state is higher than a threshold, then UE only re-establishes to the coverage layer.

Figure 5:
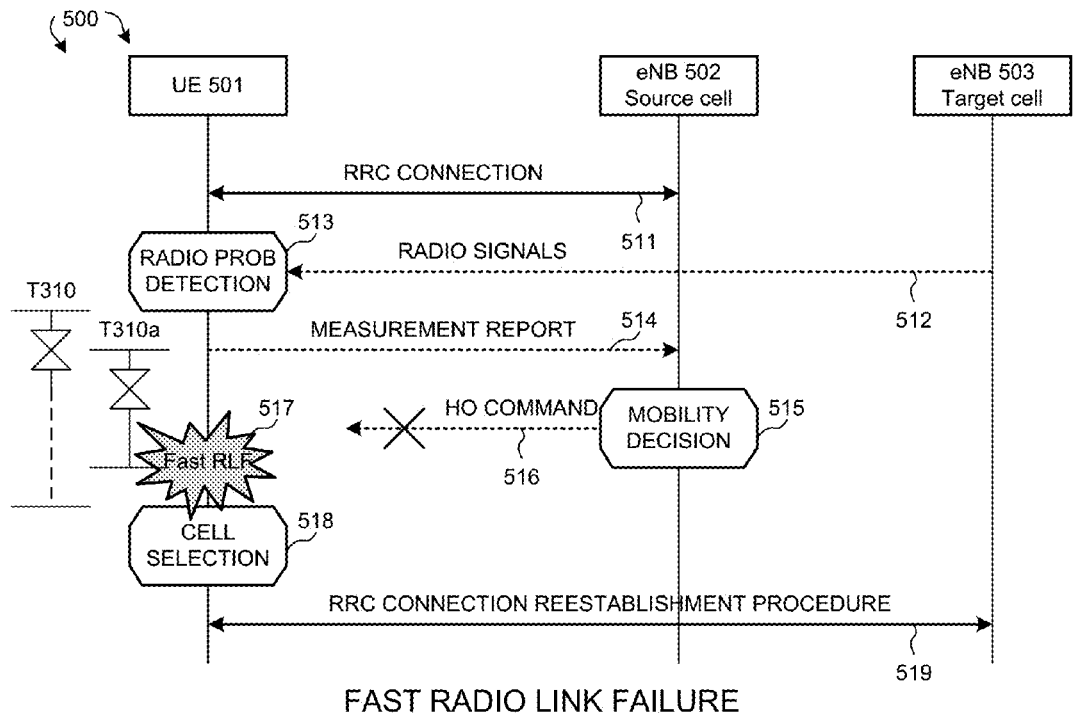
FIG. 5 illustrates a fast RLF procedure in accordance with one novel aspect.

FIG. 5 illustrates a fast RLF procedure in accordance with one novel aspect in a mobile communication network 500. Mobile communication network 500 comprises a UE 501, a serving eNB 502 (for connection in a source cell), and a target eNB 503 (for connection in a target cell). In step 511, UE 501 establishes an RRC connection with eNB 502 in the source cell. In step 512, UE 501 performs radio link monitoring and measures radio signal strength/quality. In step 513, UE 501 detects a possible radio link problem, e.g., link quality is lower than a threshold $Q_{OUT}$. Based on the legacy RLF procedure, UE 501 starts T310 timer.

In addition to the legacy RLF that relies on network-controlled source cell timer and filter, UE 501 also initiates a fast RLF procedure, which is a UE-controlled mechanism as a backup option of the legacy RLF. In one embodiment, the fast RLF only kicks off when prepared HO is likely to fail. For example, UE 501 sends a measurement report to eNB 502 in step 514, and eNB 502 makes certain mobility decision in step 515. Based on the mobile decision, eNB 502 sends an HO command to UE 501 in step 516. UE 501, however, fails to receive the HO command (e.g., due to poor radio link quality). Instead of waiting for T310 timer to expire, UE 501 triggers fast RLF in step 517 before T310 timer expires. Upon fast RLF, UE 501 performs cell selection in step 518 followed by an RRC reestablishment procedure in step 519. Without the fast RLF mechanism, UE 501 is likely to wait too long before T310 timer expires. There are many ways to shorten the RLF evaluation, and one of them is to use a new T310a timer (e.g., starts timer t310a when UE 501 sends measurement report in step 514).

Figure 6:
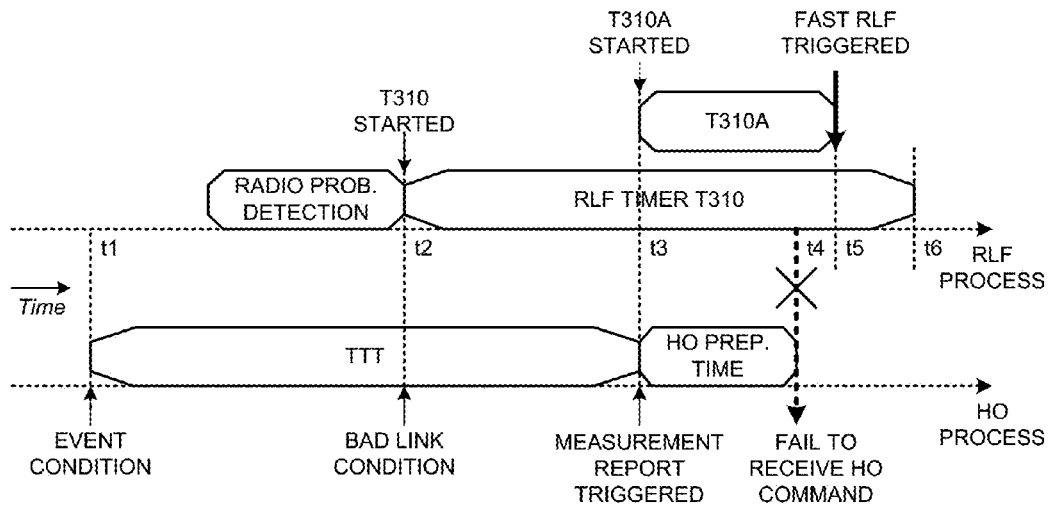
FIG. 6 illustrates one embodiment of fast RLF involving a new T310a timer.

FIG. 6 illustrates one embodiment of fast RLF involving the new T310a timer. As illustrated in FIG. 6, each UE starts two independent processes: an HO process and an RLF process. At time t1, the HO process detects an event triggering condition of the source/serving cell. In one example, the triggering event may be that the channel quality of the serving cell is worse than the channel quality of a neighbor cell by a non-negative threshold. Note that the non-negative threshold is used to mitigate ping-pong effect. In another example, the triggering event may be that the channel quality of the serving cell is lower than a first threshold and the channel quality of the neighbor cell is higher than a second threshold. On the other hand, at time t2, the RLF process detects a bad radio link condition, and starts T310 timer. Going back to the HO process, after a time-to-trigger (TTT) period from time t1, at time t3, the UE is triggered to send out a measurement report to the network. In addition, at time t3, the RLF process also starts a new T310a timer at the same time (t3) when the UE sends out the measurement report. After HO preparation time, at time t4, the UE fails to receive an HO command from the network. At time t5, the new T310a timer expires and fast RLF is triggered. Without the new T310a timer, the legacy RLF would be triggered when T310 timer expires at time t6, which is much later than time t5. The fast RLF mechanism thus reduces the outage time in the source cell.

In another embodiment of fast RLF, the UE initiates RRC reestablishment procedure before T310 timer expires if a candidate cell is identified. In general, the candidate cell is a neighbor cell with good quality (e.g., based on RSRP/RSRQ measurements). If the frequency priority or the PCI range of the candidate cell is assigned by the network, then the UE can select neighbor cells from the preferred frequency layer. The network can broadcast or unicast the criteria for candidate cell assignment. In one example, UE can reuse the same parameters for suitable cell selection as defined in legacy cell selection procedure (e.g., 3GPP TS36.304). In another example, eNB can broadcast another set of parameters for cell selection defined for HetNet deployment. Specifically, a set of PCI ranging can be attached to the configuration so that UE can differentiate pico cells from macro cells. Note that, PCI range refers to a list of cells. This fast RLF mechanism also relates to enhanced target cell selection illustrated below.

Figure 7:
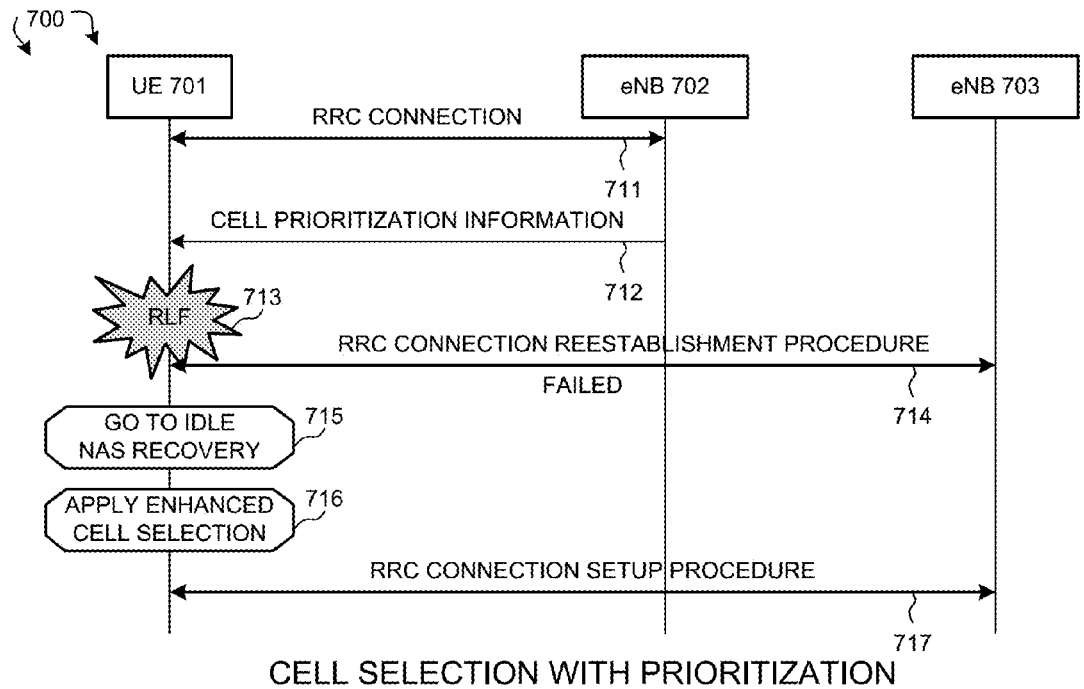
FIG. 7 illustrates one embodiment of enhanced cell selection based on cell prioritization.

FIG. 7 illustrates one embodiment of enhanced cell selection based on cell prioritization information in a mobile communication network 700. Mobile communication network 700 comprises a UE 701, a serving eNB 702 (for connection in a source cell), and a target eNB 703 (for connection in a target cell). In step 711, UE 701 establishes an RRC connection with eNB 702 in the source cell. In step 712, UE 701 receives cell prioritization information from eNB 702. The priority could be based on frequency layers (one frequency layer is configured as mobility layer in multi-frequency scenario) or based on intra-frequency cell coverage (cells with larger coverage are configured as mobility cells in single-frequency scenario). The cell prioritization information may be carried by a broadcasting channel (BCH) or by a unicasting RRC message. Note that the priority list in System Information Block (SIB) is mainly for cell reselection, which may be inappropriate for cell selection after RRC reestablishment. Therefore, a specific priority list is needed for cell selection. In one example, PCI-range method can be applied in both multi-frequency and single-frequency scenarios (e.g., a set of mobility cells are identified by PCI ranging).

In step 713, UE 701 detects RLF and performs RRC reestablishment procedure with eNB 703 in the selected target cell (step 714). If the RRC reestablishment fails, then UE 701 goes to RRC idle mode and starts NAS recovery in step 715. UE 701 again applies enhanced cell selection based on the cell prioritization information (step 716). Finally, in step 717, UE 701 performs RRC connection setup procedure with eNB 703.

In one embodiment of enhanced cell selection, a UE selectively applies cell prioritization only when UE has high moving speed or high mobility. In general, a UE with high moving speed should only re-connect to a coverage layer, which can be indicated by eNB via broadcasting or unicasting. In one example, if UE mobility state is higher than a threshold, then UE only re-establishes to the coverage layer. The threshold can be signaled by broadcasting or unicasting method. In another example, if UE mobility state is high, then UE only re-establishes to the coverage layer. This could be hard coded in specification where only cells in certain frequency layers can be used as the cell selection candidates.

For some deployments with different radio access technologies (RATs), it is expected that a UE may move between RATs frequently. For example, if LTE is deployed spotty, then it is highly possible that the UE moves out the coverage of LTE and into the vicinity of UTRA/GERAN networks. In one novel aspect, the UE registers in both LTE and other RATs (UTRA, GERAN, or CDMA2000) that provide mobility coverage. In addition, the UE receives priority indication of the frequency layers or RATs to steer cell selection for connection recovery.

Figure 8:
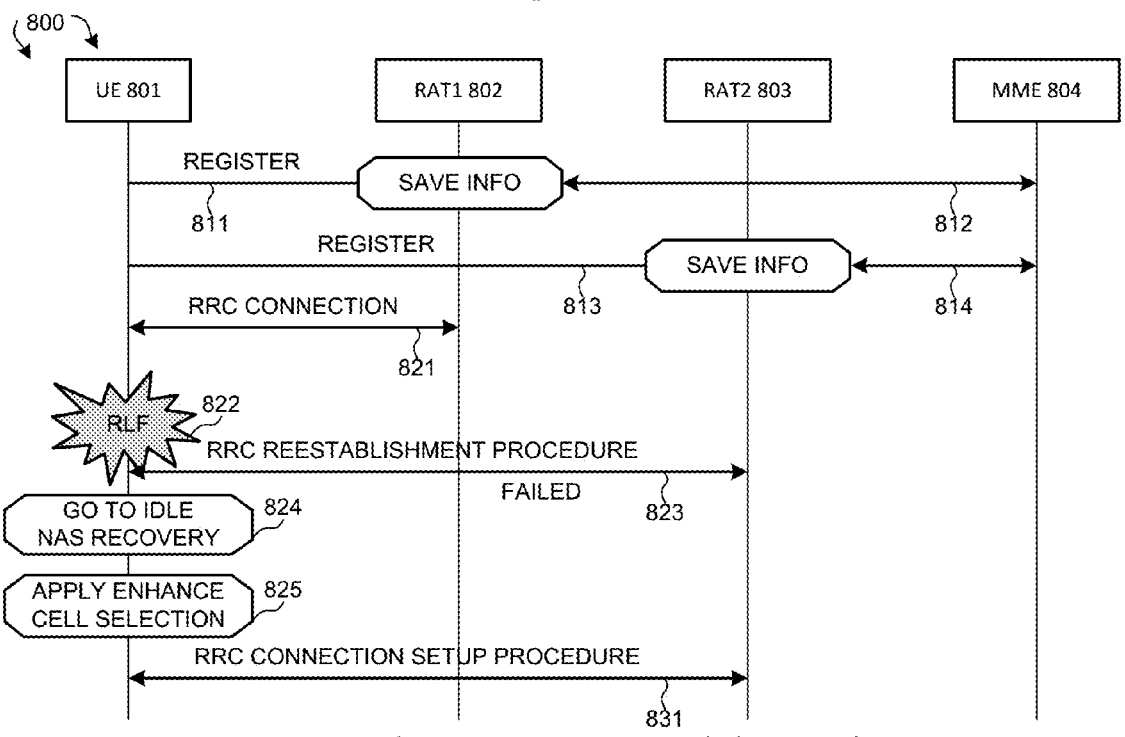
FIG. 8 illustrates one embodiment of enhanced cell selection with multi-RAT registration.

FIG. 8 illustrates one embodiment of enhanced cell selection with multi-RAT registration in a mobile communication network 800. Mobile communication network 800 comprises UE 801, a first RAT1 802, a second RAT2 803, and a mobility management entity MME 804. In step 811, UE 801 registers for RAT1 in NAS layer. In step 813, UE 801 registers for RAT 2 in NAS layer. After registration, NAS layer negotiation is completed (i.e., UE is attached), and the MME information is stored in the eNB for both RATs (step 812 and step 814). In step 821, UE 801 establishes an RRC connection with RAT1. Later on, in step 822, UE 801 detects RLF and performs RRC reestablishment procedure with RAT2 (step 823). Because UE 801 already registered with RAT2, no additional NAS registration is needed. The benefit is to avoid the long delay associated with security setup from a home subscription server (HSS) when UE comes from a detached state. If the RRC reestablishment fails, then UE 801 goes to RRC idle mode and starts NAS recovery in step 824. UE 801 again applies enhanced cell selection based on the cell prioritization information (e.g., prioritized frequency layers and/or RATs) (step 825). Instead of randomly selecting a cell, the cell selection is steered based on the cell prioritization information. Finally, in step 831, UE 801 performs RRC connection setup procedure with RAT2.

Figure 9:
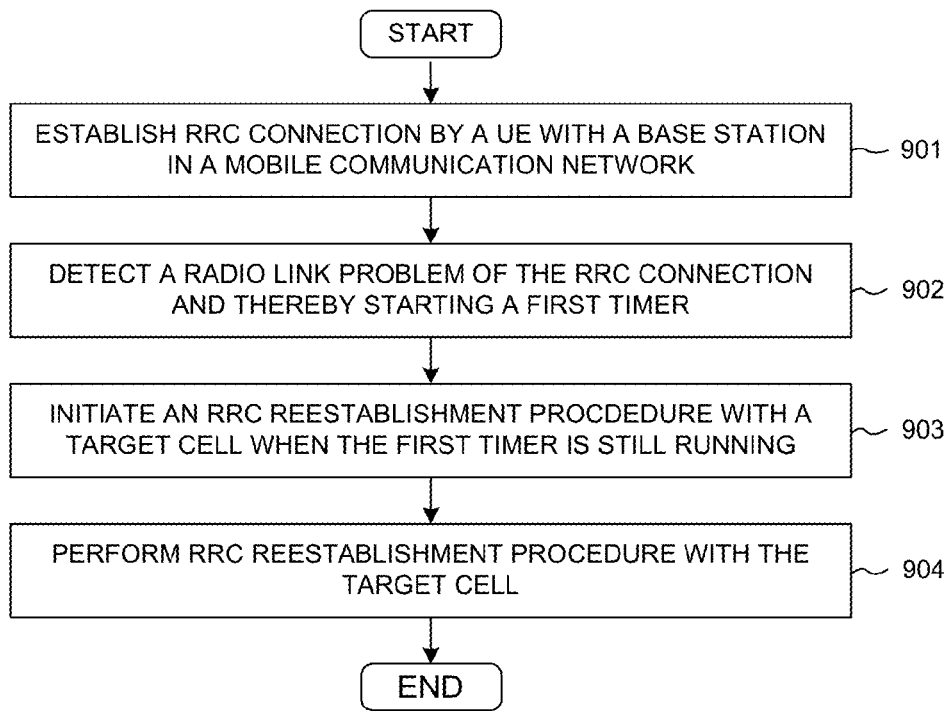
FIG. 9 is a flow chart of a method of fast radio link failure procedure.

FIG. 9 is a flow chart of a method of fast radio link failure procedure in accordance with one novel aspect. In step 901, a UE establishes an RRC connection with a serving eNB in a mobile communication network. In step 902, the UE detects a radio link problem of the RRC connection. The UE then starts a first timer (e.g., T310). In step 903, the UE detects RLF and initiates an RRC reestablishment procedure with a target cell before the first timer expires. In step 904, the UE performs RRC reestablishment procedure with the selected target cell. In one embodiment, a second timer (e.g., T310a) is started when the UE sends a measurement report to the eNB. RRC reestablishment is performed when the second timer expires. In another embodiment, the UE initiates RRC reestablishment before the first timer expires if a candidate cell (e.g., a neighbor cell with better radio link quality than the serving cell) is identified by the network.

Figure 10:
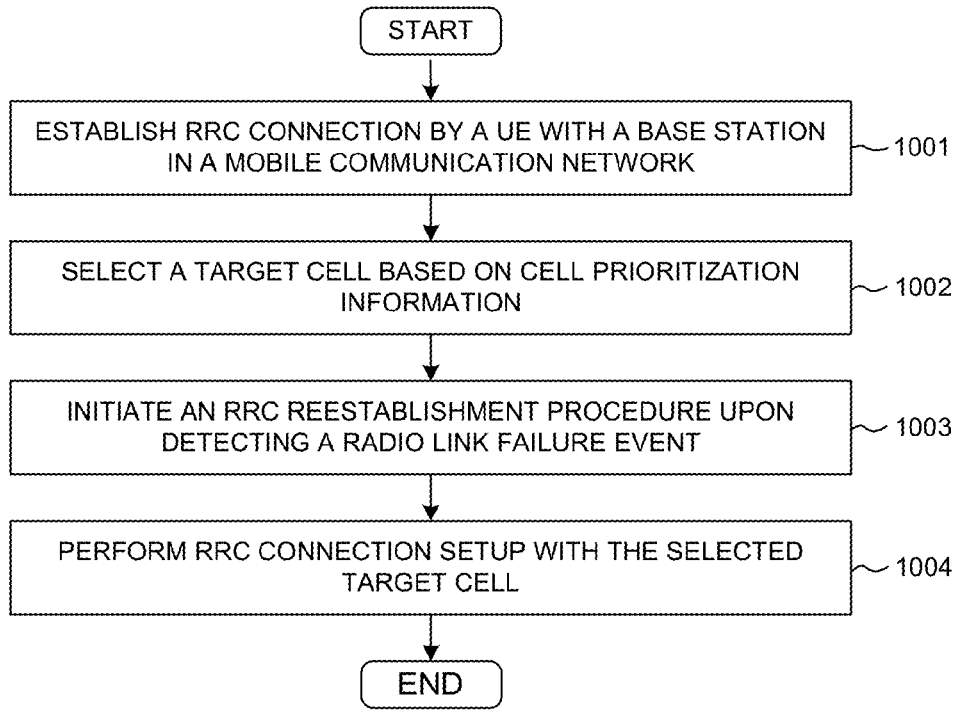
FIG. 10 is a flow chart of a method of enhanced cell selection with prioritization.

FIG. 10 is a flow chart of a method of enhanced cell selection with prioritization in accordance with one novel aspect. In step 1001, a UE establishes an RRC connection with a serving eNB in a mobile communication network. In step 1002, the UE selects a target cell based on cell prioritization information transmitted from the eNB. In step 1003, the UE initiates an RRC reestablishment procedure upon detecting a radio link failure event. In step 1004, the UE performs RRC connection setup with the selected target cell. The priority for cell selection could be based on frequency layers with good mobility coverage or based on intra-frequency cells with good mobility coverage. In one embodiment, multi-RAT registration is applied to steer cell selection. In another embodiment, the cell prioritization is selectively applied to UEs with high mobility state.

Enhanced Connection Recovery and Reduced Data Loss

When a target eNB receives RRC reestablishment message from UE, the target eNB needs UE context information to restore the RRC connection. UE context contains information, such as, UE capability information and NAS configuration information. If the UE context has been forwarded from the source eNB to the target eNB already, then the RRC reestablishment is likely to be successful. Otherwise, if the UE context is unavailable to the target eNB, then the legacy RRC reestablishment will fail. Several methods are proposed to enhance the legacy RRC reestablishment procedure from the network perspective. In a first method, the target eNB tries to obtain the UE context as quick as possible via a novel fast NAS recovery procedure. In a second method of context fetching, the target eNB tries to fetch/obtain the UE context from the source eNB via X2 interface. In a third method, a loss-less reestablishment procedure is applied to reduce the data loss during recovery. Each method is now described below with details.

Figure 11:
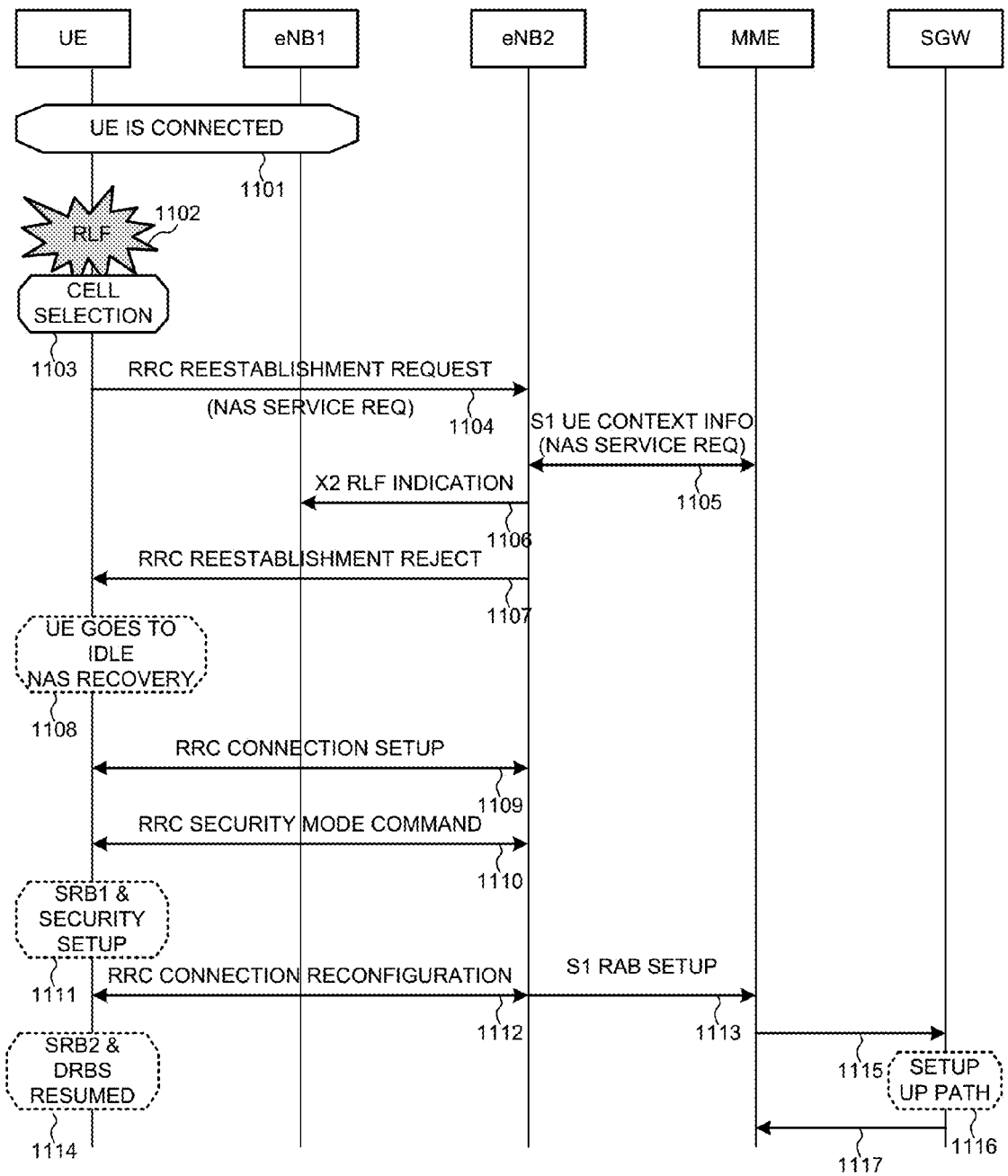
FIG. 11 illustrates a first embodiment of RRC reestablishment procedure with fast NAS recovery.

FIG. 11 illustrates a first embodiment of an RRC reestablishment procedure with fast NAS recovery in a mobile communication network. The mobile communication network comprises a UE, a source eNB1, a target eNB2, an MME, and an SGW. In step 1101, the UE is connected to source eNB1. In step 1102, the UE detects RLF and performs cell selection in step 1103. In step 1104, the UE transmits an RRC reestablishment request message to target eNB2. The RRC reestablishment may fail because target eNB2 may not have UE context information. Accordingly, a "NAS service request" is triggered by the RRC reestablishment request. Once eNB2 receives the NAS service request, eNB2 inquires the UE context information by forwarding the NAS service request to the MME via S1 interface (step 1105). In step 1106, target eNB2 sends an RLF indication to source eNB1. In step 1107, eNB2 sends an RRC reestablishment reject message to the UE because eNB2 has not received the UE context information yet. In step 1108, the UE goes to RRC idle mode and starts NAS recovery. In step 1109, the UE performs RRC connection setup with target eNB2. In step 1110, the UE exchanges RRC security command with target eNB2. In step 1111, SRB1 and security is setup. In step 1112, the UE performs RRC connection reconfiguration with target eNB2, which sends an S1 RAB setup message to the MME to establish EPS bearer via S1 interface. In step 1114, SRB2 and DRBS are resumed. In steps 1115-1117, the MME and the SGW setup the UP path.

In a legacy NAS recovery, the NAS service request is triggered during the RRC connection setup procedure (e.g., step 1109), which is after the UE goes to RRC idle mode. In the above-illustrated fast NAS recovery, the NAS service request is triggered by the RRC reestablishment request (e.g., step 1104). In this way, the target eNB can try to obtain the UE context as quick as possible. Typically, it takes some time (e.g., several seconds) for the target eNB to obtain the UE context from the MME via S1 interface. Therefore, by triggering the NAS service request earlier, the UE outage time in the target cell is reduced. In an optimized NAS recovery, if the RRC reestablishment is successful, then the UE may not need to go to RRC idle mode.

Figure 12:
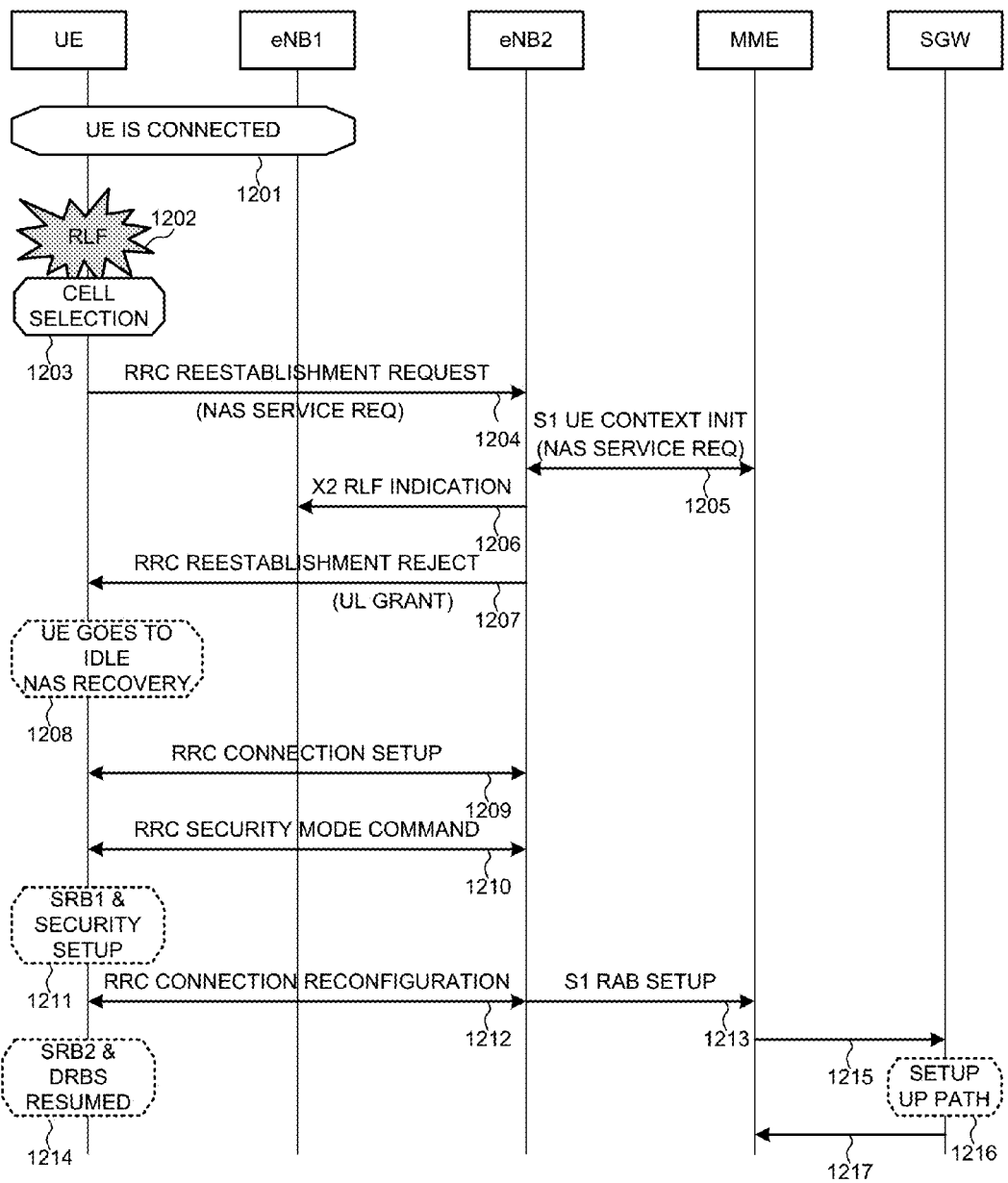
FIG. 12 illustrates a second embodiment of RRC reestablishment procedure with fast NAS recovery.

FIG. 12 illustrates a second embodiment of an RRC reestablishment procedure with fast NAS recovery in a mobile communication network. The mobile communication network comprises a UE, a source eNB1, a target eNB2, an MME, and an SGW. The RRC reestablishment procedure (steps 1201 to 1217) are substantially the same as the RRC reestablishment procedure (steps 1101 to 1117) illustrated in FIG. 11. This second embodiment of fast NAS recovery provides a small improvement to the first embodiment. In step 1207, when eNB2 sends an RRC reestablishment reject message to the UE, eNB2 autonomously provides uplink resource (e.g., an UL grant) to the UE for the subsequent RRC connection setup procedure (step 1209). Typically, when the UE performs RRC connection setup, the UE needs to initiate a radon access procedure via a random access channel (RACH) for uplink resource. Note that, some additional time is needed for contention resolution in RACH procedure. In the example of FIG. 12, however, because the UE already receives the UL grant contained in the RRC reestablishment reject message, the UE does not need to initiate RACH for RRC connection setup with the target eNB. As a result, the UE outage time in the target cell is reduced.

Figure 13:
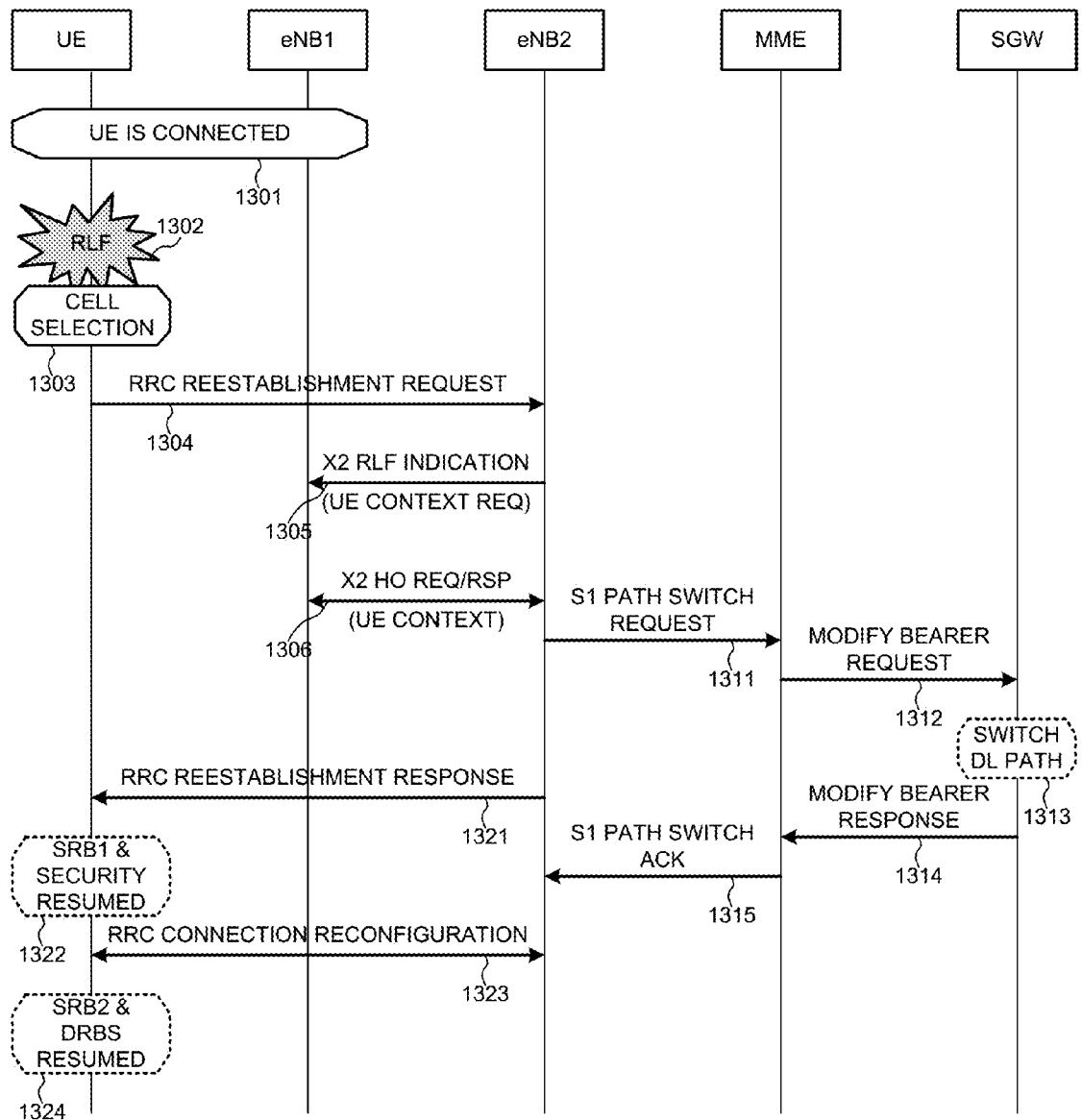
FIG. 13 illustrates one embodiment of RRC reestablishment procedure with context fetching.

FIG. 13 illustrates one embodiment of an RRC reestablishment procedure with context fetching in a mobile communication network. The mobile communication network comprises a UE, a source eNB1, a target eNB2, an MME, and an SGW. In step 1301, the UE is connected to source eNB1. In step 1302, the UE detects RLF and performs cell selection in step 1303. In step 1304, the UE transmits an RRC reestablishment request message to target eNB2. The RRC reestablishment request message indicates to eNB2 that the UE is from eNB1, and the UE would like to connect to eNB2 due to poor radio link quality. However, the RRC reestablishment may fail because eNB2 may not have UE context information. Accordingly, in step 1305, eNB2 uses an RLF indication as a request for the UE context from eNB1 via X2 interface. Typically, the RLF indication only indicates to eNB1 for the purpose of self-organization network (SON) feature. In one novel aspect, the RLF indication also comprises a request for the UE context. For example, a new information element (IE) may be used, which requires mandatory response. Once eNB1 receives the RLF indication with UE context request, eNB1 sends the UE context information back to eNB2 during subsequent HO request and response exchanged in step 1306.

At the core network side, in step 1311, eNB2 sends a path switch request to the MME via S1 interface, and the MME sends a modify bearer request to the SGW in step 1312. In step 1313, the SGW switches the DL path. In step 1314, the SGW sends a modify bearer response back to the MME, and the MME sends a path switch acknowledgment back to eNB2 via S1 interface in step 1315. At the radio access side, in step 1321, eNB2 sends an RRC reestablishment response message to the UE after successfully receiving the UE context information from eNB1. In step 1322, SRB1 and security is resumed. In step 1323, RRC connection reconfiguration is performed between the UE and target eNB2. In step 1324, SRB2 and DRBS are resumed. In the above-illustrated RRC reestablishment procedure, because target eNB2 tries to obtain the UE context from source eNB1 via X2 interface (instead of obtaining the UE context from the MME via S1 interface), and because X2 interface is typically much faster than S1 interface, target eNB2 is able to successfully complete the RRC reestablishment procedure. As a result, the UE outage time in the target cell is reduced.

In addition to reducing outage time, reducing data loss is also important for the connection recovery process. Typically, to avoid packet data loss, packet data convergence protocol (PDCP) operation needs to be reestablished and resumed without interruption. For HO operation as defined in current LTE specification, the source eNB forwards the PDCP serial number (SN) report and data to the target eNB. The PDCP operation can be resumed when handover procedure is done. For RRC reestablishment, PDCP layer can be reestablished after successful RRC reestablishment. However, if the target cell for reestablishment has no prior PDCP status report, then PDCP operation cannot be resumed without interruption, i.e., data loss occurs during recovery. This scenario could happen when RLF occurs abruptly and UE selects to a cell other than the previous serving cell.

Figure 14:
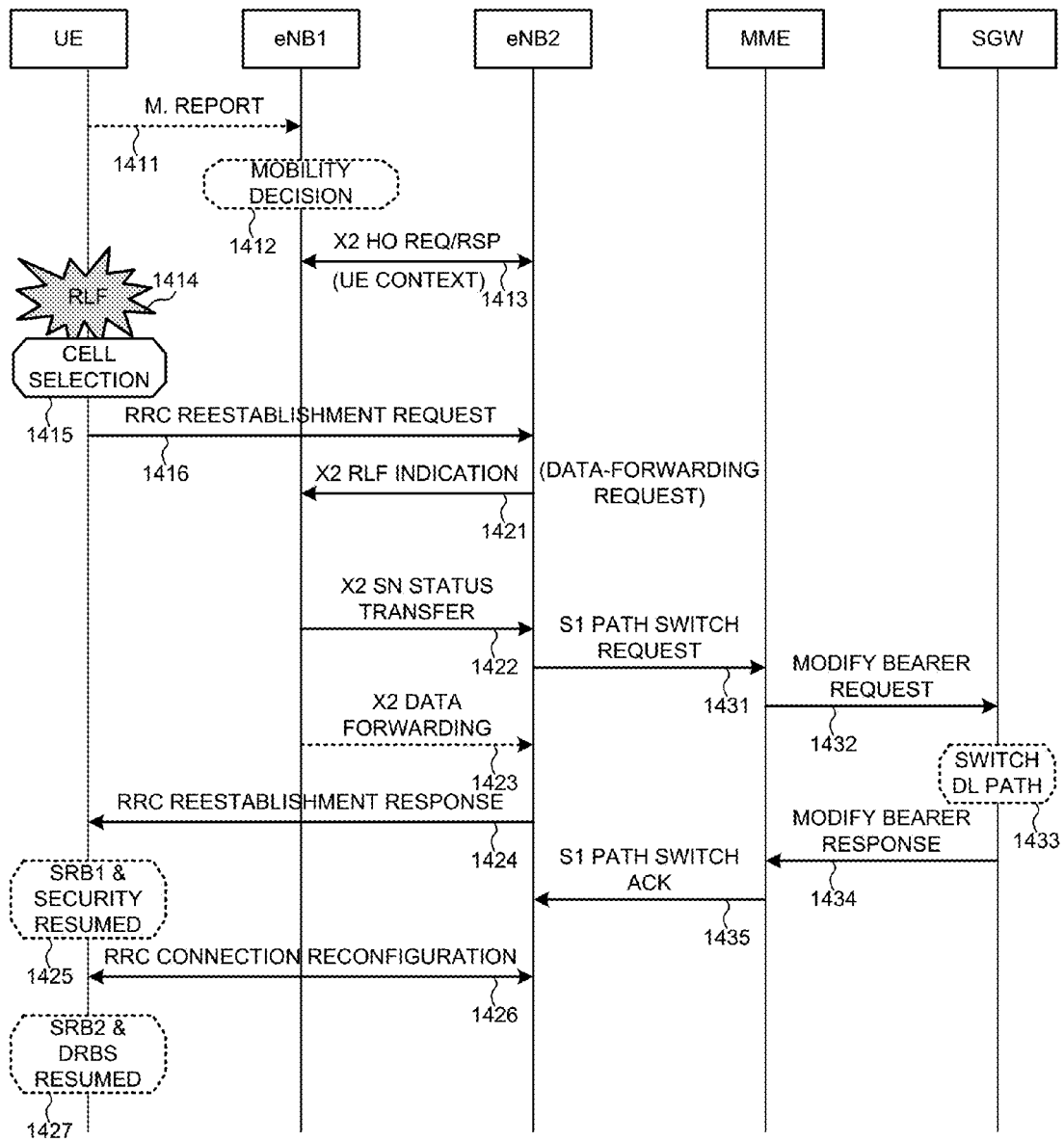
FIG. 14 illustrates one embodiment of loss-less RRC reestablishment procedure.

FIG. 14 illustrates one embodiment of a loss-less RRC reestablishment procedure in a mobile communication network. The mobile communication network comprises a UE, a source eNB1, a target eNB2, an MME, and an SGW. In step 1411, the UE sends a measurement report to source eNB1 triggered by a certain event. In step 1412, eNB1 makes mobility decision based on the measurement report. For example, eNB1 may decide to handover the UE to target eNB2. In step 1413, eNB1 and eNB2 exchange HO request and response with UE context information. In step 1414, the UE detects RLF and performs cell selection in step 1415. In step 1416, the UE sends an RRC reestablishment request to target eNB2. The RRC reestablishment will be successful because eNB2 already receives the UE context information. In step 1421, eNB2 sends an RLF indication to eNB1 via X2 interface. To prevent data loss, the RLF indication comprises a data-forwarding request for PDCP status and for U-plane data. In step 1422, eNB1 sends a PDCP SN status transfer to eNB2. Optionally, in step 1423, eNB1 also sends U-plane data forwarding to eNB2.

At the core network side, in step 1431, eNB2 sends a path switch request to the MME via S1 interface, and the MME sends a modify bearer request to the SGW in step 1432. In step 1433, the SGW switches the DL path. In step 1434, the SGW sends a modify bearer response back to the MME, and the MME sends a path switch acknowledgment back to eNB2 via S1 interface in step 1435. At the radio access side, in step 1424, eNB2 sends an RRC reestablishment response message to the UE. In step 1425, SRB1 and security is resumed. In step 1426, RRC connection reconfiguration is performed between the UE and target eNB2. In step 1427, SRB2 and DRBS are resumed.

In the above-illustrated example, X2 interface is used to trigger PDCP status transfer and data forwarding between the old and the new serving cell. The proposed PDCP/data forwarding can be combined with context fetching as illustrated in FIG. 13. For example, when source eNB1 receives the RLF indication from target eNB2, the RLF indication may comprises both a UE context request and a data-forwarding request. Upon receiving the RLF indication, eNB1 sends a response message that includes the following information: UE context information, PDCP SN status, and forwarded U-plane data. Note that, the above-mentioned enhancements by using RLF indication over X2 interface is one of the possible embodiments. In other embodiments, a new defined X2 message for UE context request or PDCP SN request can be used.

Figure 15:
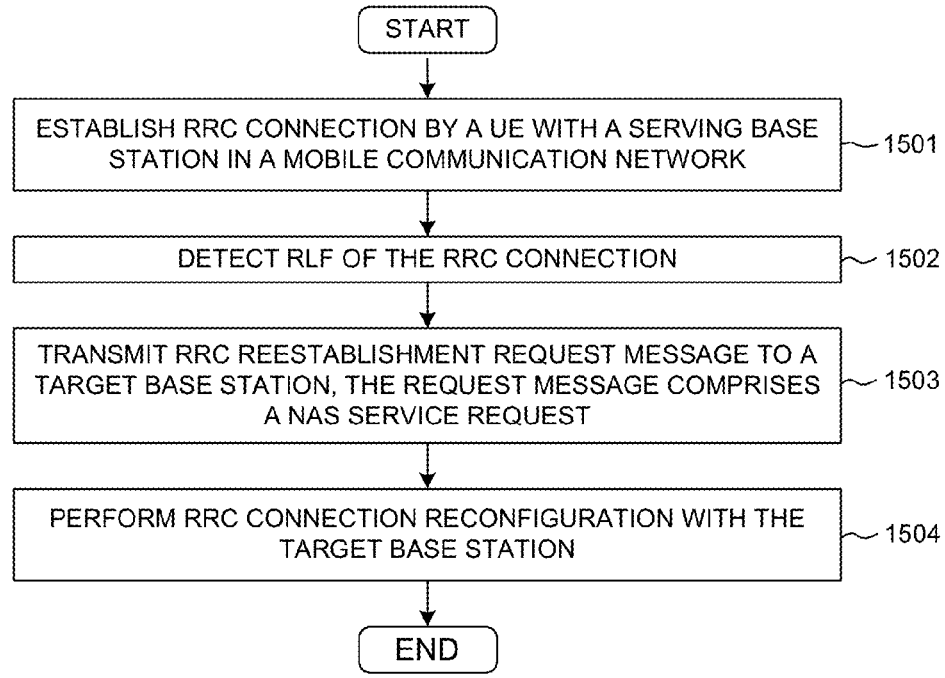
FIG. 15 is a flow chart of a method of fast NAS recovery in target cell from UE perspective.

FIG. 15 is a flow chart of a method of fast NAS recovery in target cell from UE perspective. In step 1501, a UE establishes an RRC connection with a serving base station in a mobile communication network. In step 1502, the UE detects RLF of the RRC connection. In step 1503, the UE transmits an RRC reestablishment request message to a target base station. The RRC reestablishment request indicates to the target base station that the UE is from a serving base station, and the UE would like to connect to the target base station due to poor radio link quality in the serving cell. In addition, the RRC reestablishment request message comprises a NAS service request. The target base station inquires UE context from an MME upon receiving the NAS service request. In step 1504, the UE performs RRC connection reconfiguration with the target base station. Because the NAS service request is triggered by the RRC reestablishment, the target base station can obtain UE context quicker. Such fast NAS recovery thus reduces outage time in the target cell.

Figure 16:
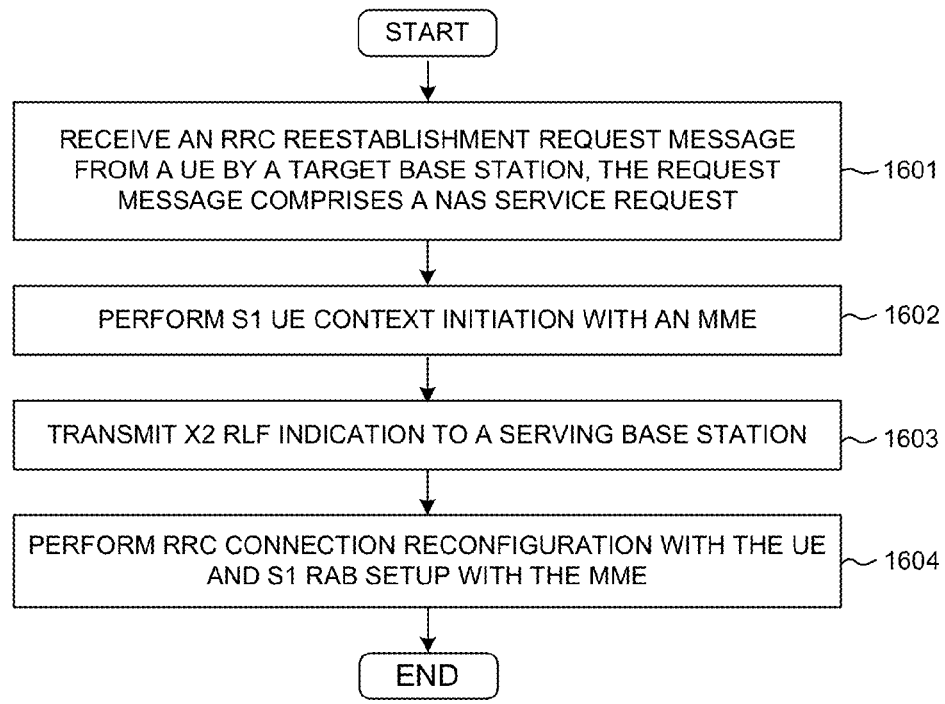
FIG. 16 is a flow chart of a method of fast NAS recovery in target cell from BS perspective.

FIG. 16 is a flow chart of a method of fast NAS recovery in target cell from eNB perspective. In step 1601, a target base station receives an RRC reestablishment request message from a UE in a mobile communication network. The RRC reestablishment request indicates to the target base station that the UE is from a serving base station, and the UE would like to connect to the target base station due to poor radio link quality in the serving cell. The RRC reestablishment request message also comprises a NAS service request. In step 1602, the target base station inquires UE context from an MME via S1 interface upon receiving the NAS service request. In step 1603, the target base station transmits an RLF indication to the serving base station via X2 interface. Finally, in step 1604, the target base station performs an RRC connection reconfiguration with the UE and S1 RAB setup with the MME. Because the NAS service request is triggered by the RRC reestablishment, the target base station can obtain UE context quicker. Such fast NAS recovery thus reduces outage time in the target cell.

FIG. 17 is a flow chart of a method of RRC reestablishment procedure with context fetching. In step 1701, a target base station receives an RRC reestablishment request message from a UE in a mobile communication network. The RRC reestablishment request indicates to the target base station that the UE is from a serving base station, and the UE would like to connect to the target base station. In step 1702, the target base station transmits an RLF indication to the serving base station. The RLF indication forwards the reestablishment request, and contains a UE context request. In step 1703, the target base station receives an X2 message (e.g., HO request message) from the serving base station. The HO request message contains the UE context information. In step 1704, the target base station transmits an RRC reestablishment response to the UE. The RRC reestablishment is successful because the target base station already has UE context. Such context fetching method by the target base station thus reduces outage time in the target cell.

FIG. 18 is a flow chart of a method of performing a loss-less RRC reestablishment procedure. In step 1801, a target base station receives an RRC reestablishment request message from a UE in a mobile communication network. The RRC reestablishment request indicates to the target base station that the UE is from a serving base station, and the UE would like to connect to the target base station. In step 1802, the target base station transmits an RLF indication to the serving base station via X2 interface. The RLF indication comprises a data-forwarding request. In step 1803, the target base station receives a PDCP SN status transfer from the serving base station. The target base station may also receive U-plane data forwarded from the serving base station. In step 1804, the target base station transmits an RRC reestablishment response to the UE and successfully completes the connection recovery. Because the target base station has prior PDCP status from the serving base station, the PDCP operation can be resumed without data loss.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for enhanced connection recovery, the method comprising:
   receiving a radio resource control (RRC) reestablishment request message from a user equipment (UE) by a target base station in a mobile wireless communication network, wherein a serving base station information is received in the request message;
   transmitting an X2 radio link failure (RLF) indication to the serving base station, wherein the X2 RLF indication comprises a UE context request and a data forwarding request;
   receiving an X2 handover (HO) request message from the serving base station after transmitting the X2 RLF indication, wherein the X2 HO request message comprises UE context information, packet data convergence protocol (PDCP) serial number (SN) status transfer, and forwarded U-plane data;
   transmitting a response message for RRC reestablishment to the UE after successfully receiving the UE context information; and
   triggering the UE to resume a signaling radio bearer (SRB) and a security mode for the RRC reestablishment based on the UE context information in the X2 HO request message.

2. The method of claim 1, wherein the UE context information comprises UE capability information and non-access stratum (NAS) configuration information.

3. The method of claim 1, wherein the UE context information is received via an X2 interface instead of via an S1 interface.

4. The method of claim 1, wherein the RLF indication is carried via a new information element that requires mandatory response from the serving base station.

5. The method of claim 1, further comprising:
   performing an RRC connection reconfiguration with the UE after transmitting the response message of RRC reestablishment to the UE.

6. The method of claim 1, further comprising:
   transmitting an S1 path switch request to a mobility management entity (MME); and
   receiving an S1 patch switch acknowledgement from the MME.

7. A base station, comprising:
   a receiver that receives a radio resource control (RRC) reestablishment request message from a user equipment (UE) by a target base station in a mobile wireless communication network, wherein a serving base station information is received in the request message;
   an X2 interface that transmits an X2 radio link failure (RLF) indication to the serving base station, wherein the X2 RLF indication comprises a UE context request and a data forwarding request, wherein the X2 interface also receives an X2 handover (HO) request message from the serving base station after transmitting the X2 RLF indication, and wherein the X2 HO request message comprises UE context information, packet data convergence protocol (PDCP) serial number (SN) status transfer, and forwarded U-plane data;
   a transmitter that transmits a response message for RRC reestablishment to the UE after successfully receiving the UE context information; and
   an RRC connection management circuit that triggers the UE to resume a signaling radio bearer (SRB) and a security mode for the RRC reestablishment based on the UE context information in the X2 HO request message.

8. The base station of claim 7, wherein the UE context information comprises UE capability information and non-access stratum (NAS) configuration.

9. The base station of claim 7, wherein the UE context information is received via the X2 interface instead of via an S1 interface.

10. The base station of claim 7, wherein the RLF indication is carried via a new information element that requires mandatory response from the serving base station.

11. The base station of claim 7, further comprising:
    an RRC connection management module that performs an RRC connection reconfiguration with the UE after transmitting the response message of RRC reestablishment to the UE.

12. The base station of claim 7, further comprising:
    an S1 interface that transmits an S1 path switch request to a mobility management entity (MME), wherein the S1 interface also receives an S1 patch switch acknowledgement from the MME.

* * * * *